(12) United States Patent
Nishimura et al.

(10) Patent No.: US 7,841,778 B2
(45) Date of Patent: Nov. 30, 2010

(54) OPTICAL CONNECTOR

(75) Inventors: Naoya Nishimura, Tokyo (JP); Hideki Miyazaki, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 12/339,838

(22) Filed: Dec. 19, 2008

(65) Prior Publication Data

US 2010/0158447 A1    Jun. 24, 2010

(51) Int. Cl.
*G02B 6/36* (2006.01)

(52) U.S. Cl. .............................. 385/83; 385/53; 385/54; 385/55; 385/56; 385/59; 385/65; 385/76; 385/78; 385/60; 385/85

(58) Field of Classification Search .............. 385/53–94
See application file for complete search history.

(56) References Cited

U.S. PATENT DOCUMENTS

| | | | | |
|---|---|---|---|---|
| 3,904,269 | A * | 9/1975 | Lebduska et al. | 385/54 |
| 4,921,325 | A * | 5/1990 | Iri et al. | 385/53 |
| 5,093,881 | A * | 3/1992 | Bortolin et al. | 385/114 |
| 5,896,479 | A * | 4/1999 | Vladic | 385/59 |
| 6,045,270 | A * | 4/2000 | Weiss et al. | 385/59 |
| 6,149,313 | A * | 11/2000 | Giebel et al. | 385/59 |
| 6,328,479 | B1 * | 12/2001 | Schofield et al. | 385/65 |
| 6,439,778 | B1 * | 8/2002 | Cairns | 385/60 |
| 6,464,405 | B2 * | 10/2002 | Cairns et al. | 385/56 |
| 6,973,242 | B2 * | 12/2005 | Yang et al. | 385/52 |
| 7,077,576 | B2 * | 7/2006 | Luther et al. | 385/59 |
| 7,517,159 | B1 * | 4/2009 | Rolston et al. | 385/89 |
| 2005/0069264 | A1 | 3/2005 | Luther et al. | |
| 2006/0177181 | A1 * | 8/2006 | Szilagyi | 385/71 |

FOREIGN PATENT DOCUMENTS

| | | |
|---|---|---|
| EP | 1 016 885 A1 | 7/2000 |
| JP | 63-231408 | 9/1988 |
| WO | WO 2006/029299 A2 | 3/2006 |
| WO | WO 2006/029299 A3 | 3/2006 |

* cited by examiner

*Primary Examiner*—Brian M. Healy
*Assistant Examiner*—Guy G Anderson
(74) *Attorney, Agent, or Firm*—Oblon, Spivak, McClelland, Maier & Neustadt, L.L.P.

(57) ABSTRACT

An optical connector 10 includes a ferrule 20 to secure the set of multiple optical fibers 100, a plug member 21 to hold the ferrule 20, and a spacer 22 having a pin 23 for guiding, the spacer being integrally fixed to the ferrule 20 by means of inserting the pin 23 into the ferrule 20 to be secured together with the ferrule within the plug member 21, wherein the ferrule 20 has at least one first positioning portion for example a recessed portion 51, 52, and the spacer 22 has at least one second positioning portion for example a projection 61, 62 which is fitted to a corresponding first positioning portion to position the ferrule to the spacer.

17 Claims, 11 Drawing Sheets

View from S1 direction    View from S2 direction

Cross sectional view along A-A

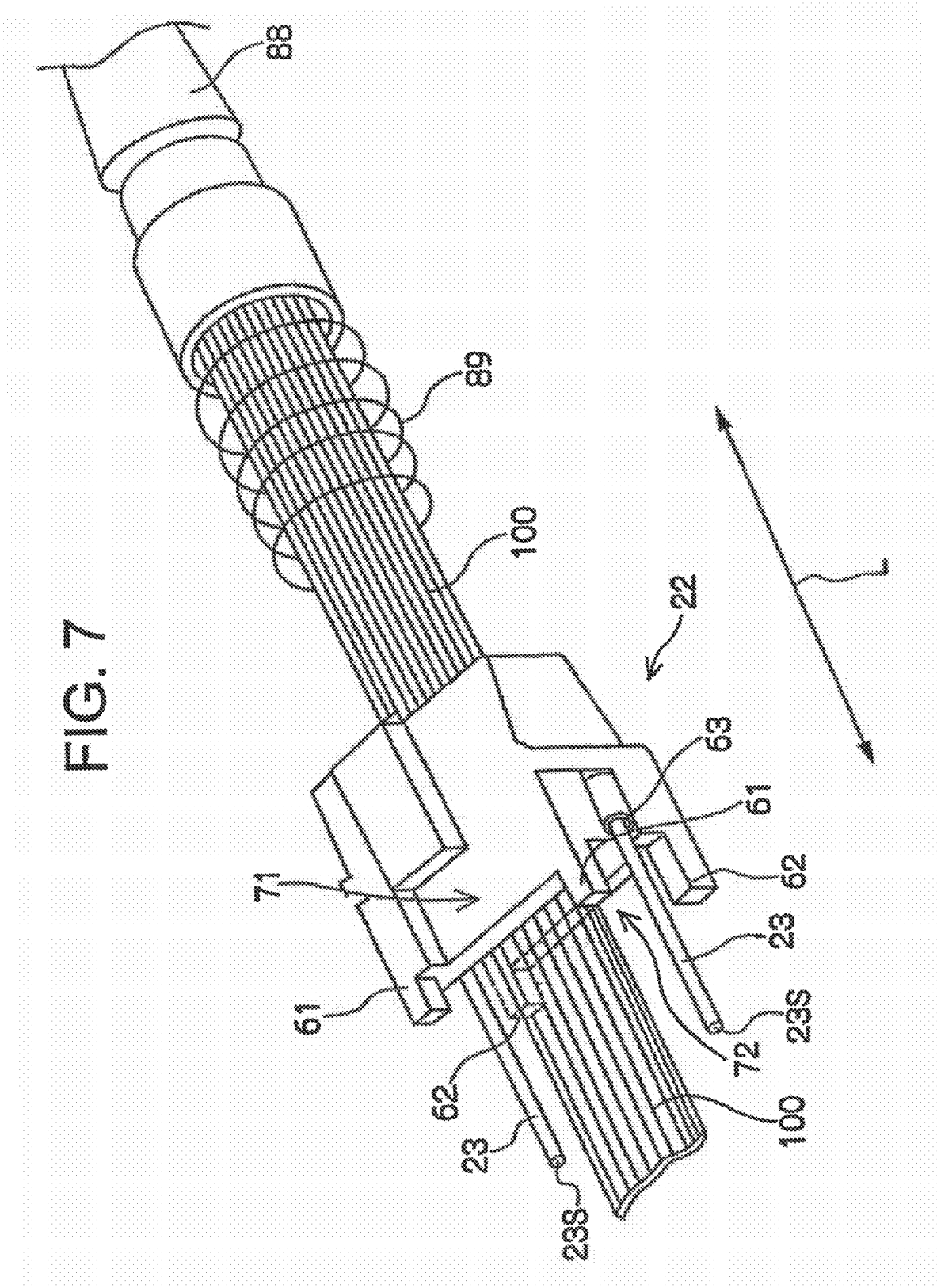

View from D1 direction

View from D2 direction

Cross sectional view along F-F

Cross sectional view along G-G

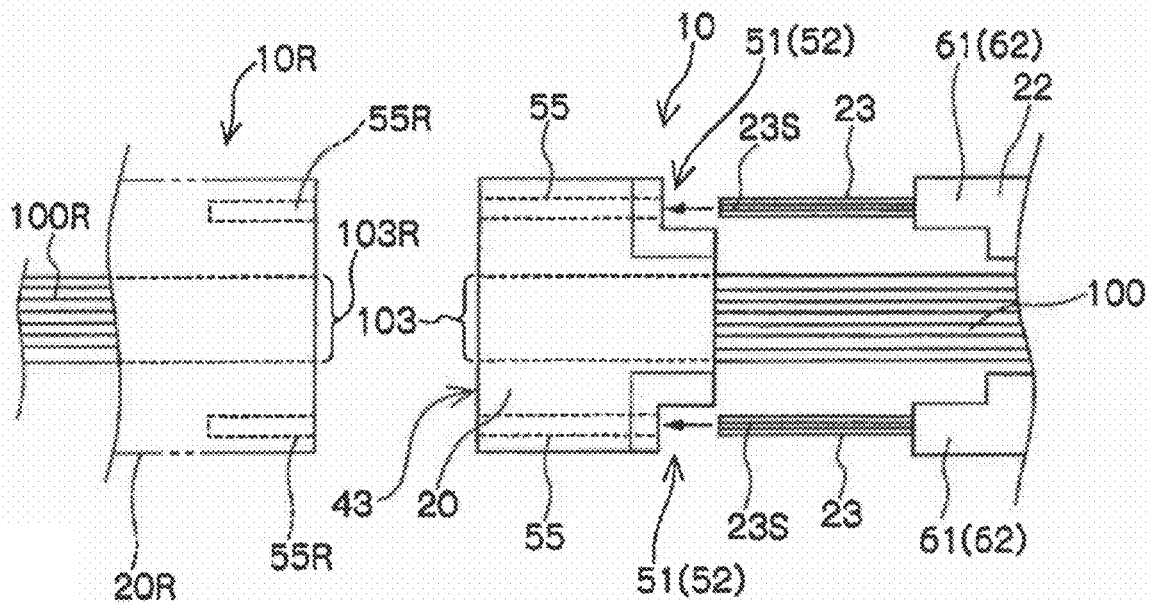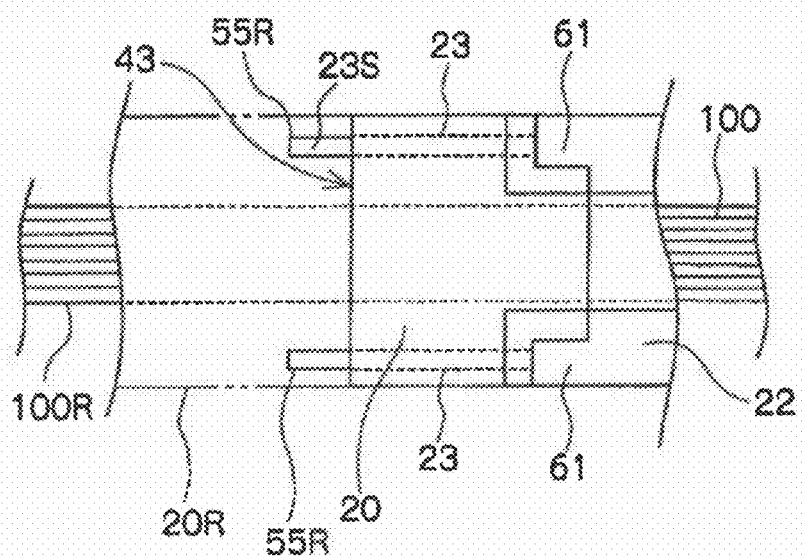

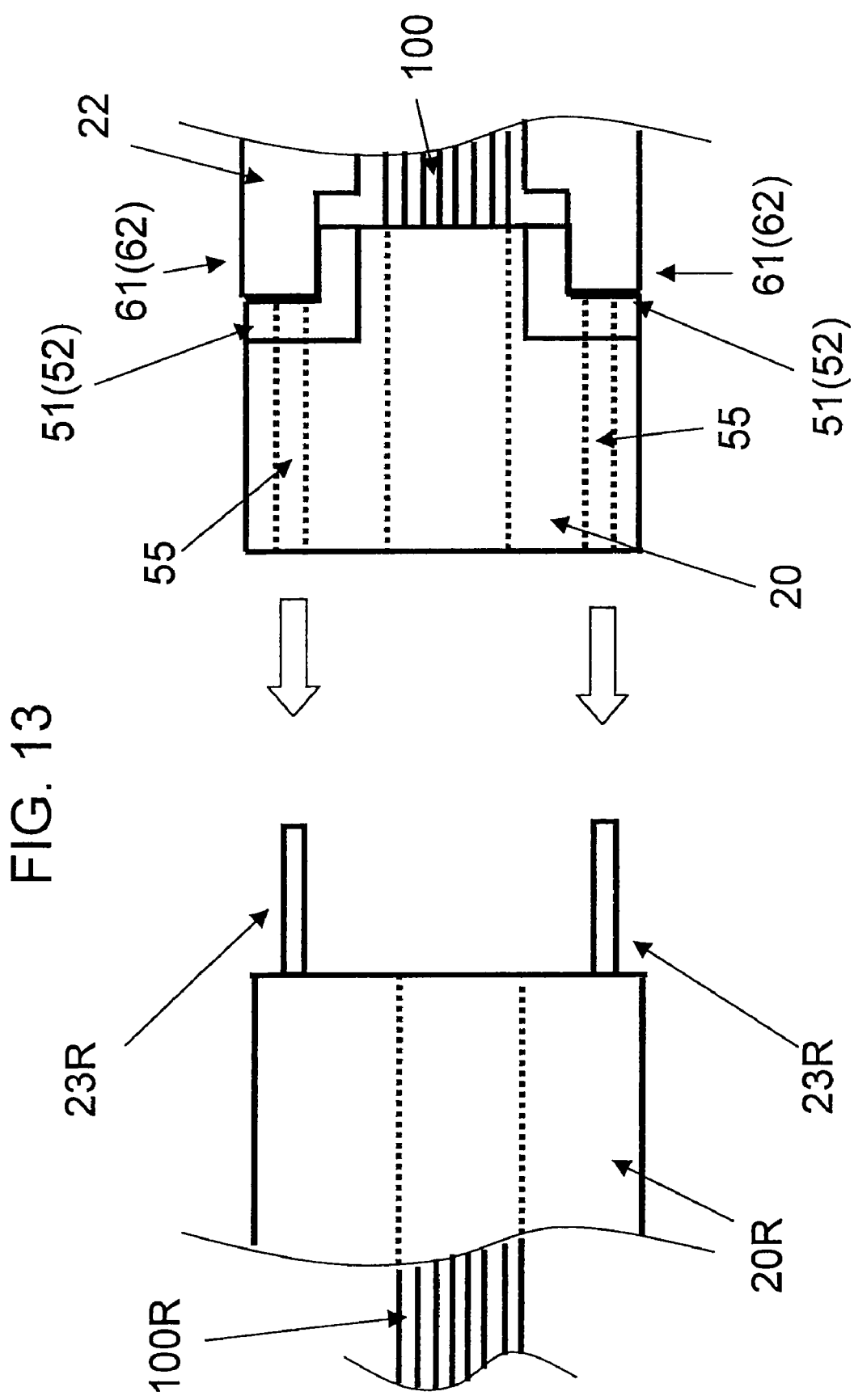

OPTICAL CONNECTOR

FIELD OF THE INVENTION

The present invention relates to an optical connector, in particular to an optical connector for connecting sets of multiple optical fibers.

BACKGROUND OF THE INVENTION

There is proposed that one optical fiber and the other optical fiber are connected with the use of a pair of ferrules and a elastic sleeve. When one optical fiber is connected to the other optical fiber, one ferrule is attached to the end portion of the one optical fiber, the other ferrule is attached to the end portion of the other optical fiber, and one ferrule is fit into the other ferrule so as to connect one optical fiber to the other optical fiber (for example, refer to Japanese Patent Application Publication No. 63-231408).

When sets of multiple optical fiber are connected, each end portion of the optical fiber in each of the set of multiple optical fibers is fixed to the ferrule, and one ferrule is butted with the other ferrule so that each end portion of the optical fiber in one set of multiple optical fibers is connected to corresponding each end portion of the optical fiber in the other set of multiple optical fibers. It is necessary to precisely position the sets of multiple optical fibers and to be connected.

The optical connector of the set of multiple optical fibers has a plug member and a ferrule to be secured within the plug member. The ferrule is required to be simply and surely secured within the plug member with high precision.

One of the object of the invention is therefore to provide an optical connector enabling to simply and surely secure the ferrule within the plug member with high precision, in order to solve the above described problem.

SUMMARY OF THE INVENTION

In order to solve the above described problems, there is proposed an optical connector for connecting two sets of multiple optical fibers, which includes:

a ferrule to secure the set of multiple optical fibers;

a plug member to hold the ferrule; and a spacer to be secured together with the ferrule within the plug member, wherein the ferrule has at least one first positioning portion, and the spacer has at least one second positioning portion which is fitted to a corresponding first positioning portion to position the ferrule to the spacer.

In the optical connector, the spacer has a pin for guiding, the spacer being integrally fixed to the ferrule by means of inserting the pin into the ferrule to be secured together with the ferrule within the plug member.

In the optical connector, the first positioning portion preferably comprises a recessed portion, and the second positioning portion comprises a projection.

In the optical connector, the first positioning portion preferably comprises a projection, and the second positioning portion comprises a recessed portion.

In the optical connector, the first positioning portion preferably comprises a plurality of positioning portions formed in the ferrule, and the second positioning portion comprises a plurality of positioning portions formed in the spacer.

In the optical connector, the spacer preferably further includes a receiving hole for receiving the set of multiple optical fibers, and a multiple optical fibers guiding groove for guiding the set of multiple optical fibers into the receiving hole from outside of the spacer.

In the optical connector, a direction of forming the multiple optical fibers guiding groove preferably slants to a longitudinal direction of the receiving hole.

BRIEF DESCRIPTION OF THE DRAWINGS

FIG. 7 is a perspective view to depict the spacer and the set of multiple optical fibers.

FIG. 12 is a view to show the state in which the set of multiple optical fibers is butted to the other set of multiple optical fibers and positioned thereto.

BEST MODE FOR CARRYING OUT THE INVENTION

Favorable embodiments of the invention are described in detail with reference to the drawings hereunder.

Figure 1:
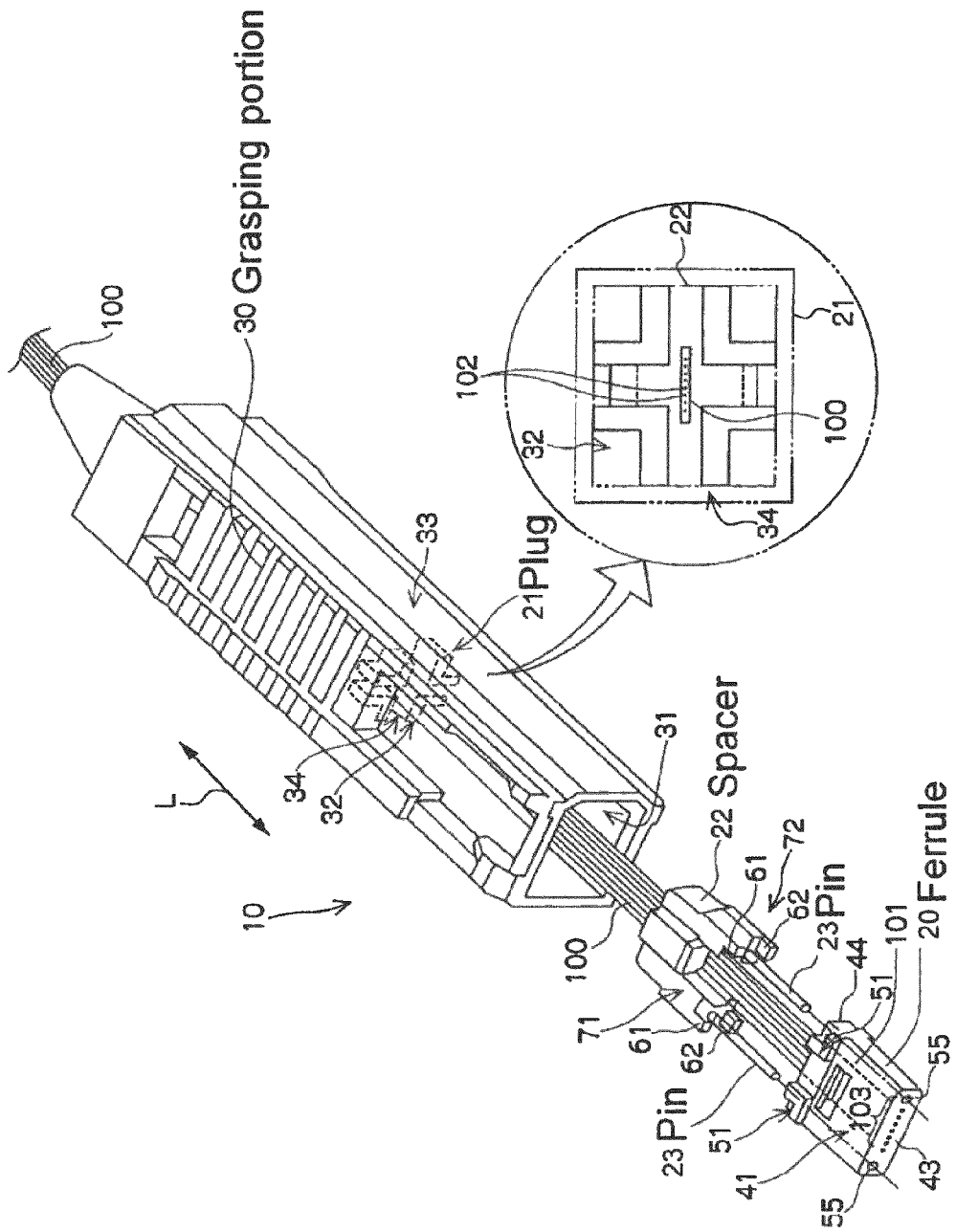
FIG. 1 is a disassembled perspective view to depict a favorable embodiment of the optical connector of the invention.

FIG. 1 is a perspective view to depict a favorable embodiment of the optical connector of the invention.

The optical connector 10 as depicted in FIG. 1 is an optical connector for connecting one set of the multiple optical fibers to another set of the multiple optical fibers. The optical connector 10 includes a ferrule 20, a plug member 21 and a spacer 22. The ferrule 20 holds end portions 103 of the set of multiple optical fibers 100 to be connected. The spacer 22 and the ferrule 20 are received and secured within the plug member 21. The ferrule 20, the plug member 21 and the spacer 22 are molded from plastic material.

Figure 2:
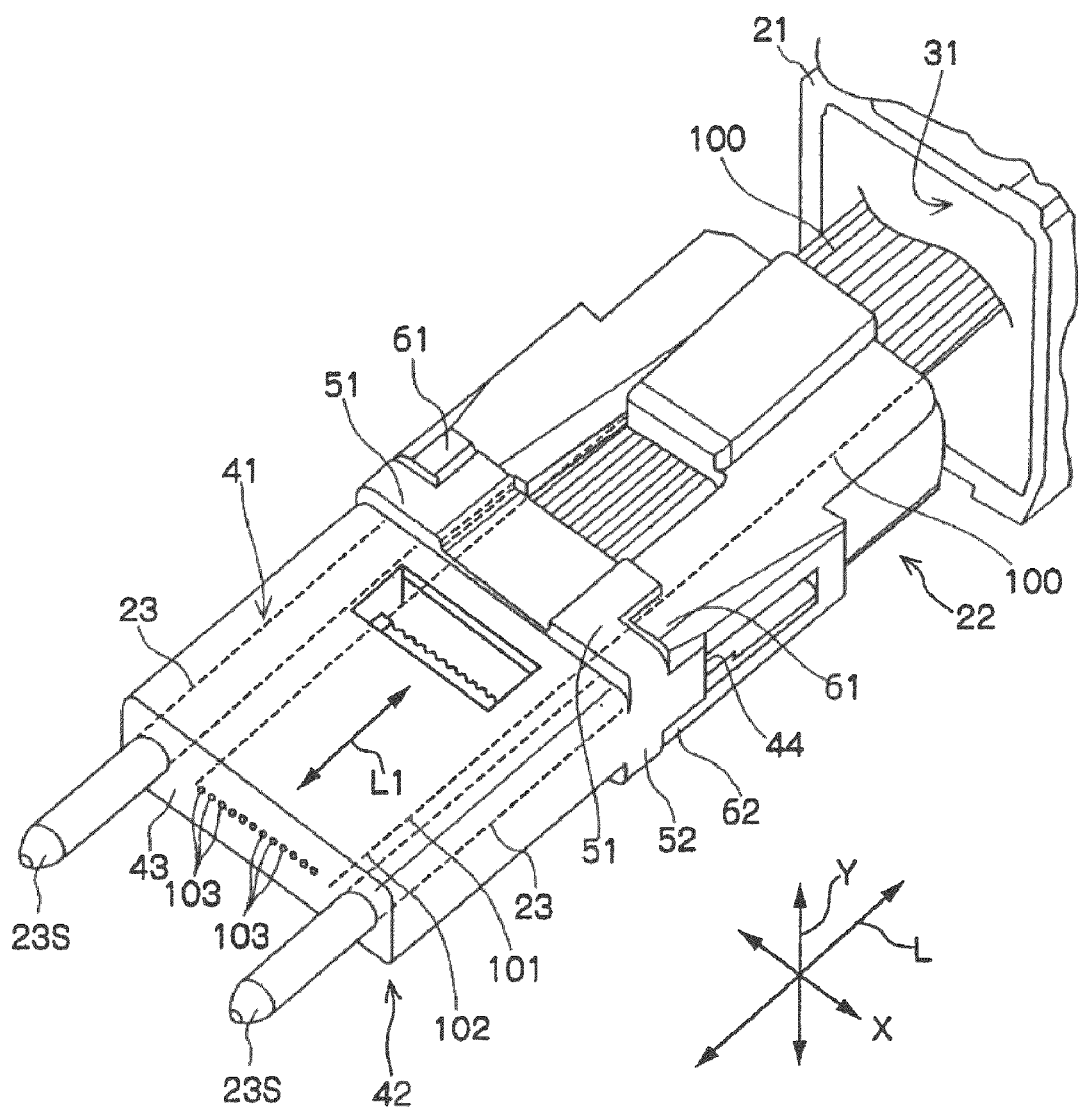
FIG. 2 is an assembled perspective view of the ferrule and the spacer of the optical connector depicted in FIG. 1.

The spacer 22 has two pins 23, 23 for guiding. The pins 23, 23 are inserted into respective holes 55, 55 for guiding formed in the ferrule 20 so that the spacer 22 is integrally secured with the ferrule 20. FIG. 1 shows a condition in which the ferrule 20, the plug member 21 and the spacer 22 are disassembled. FIG. 2 shows a condition in which the ferrule 20 and the spacer 22 are already assembled, and the assembled ferrule 20 and spacer 22 are to be received in the plug member 21.

The structure of the plug member 21 is described with reference to FIG. 1.

The plug member 21 is a member having a hollow portion therein, and the cross section thereof perpendicular to a longitudinal direction L has a rectangular shape. The plug member 21 includes a grasping portion 30 and the hollow portion 31 having the rectangular cross section. The hollow portion 31 is formed along the longitudinal direction L of the plug member 21. A holding portion 32 is secured to the inside of an intermediate portion 33 of the hollow portion 31. The holding portion 32 is a member to position the spacer 22 and hold it thereto. The holding portion 32 has a cross-like fitting groove 34 into which the spacer 22 is fit and held therein.

Figure 3:
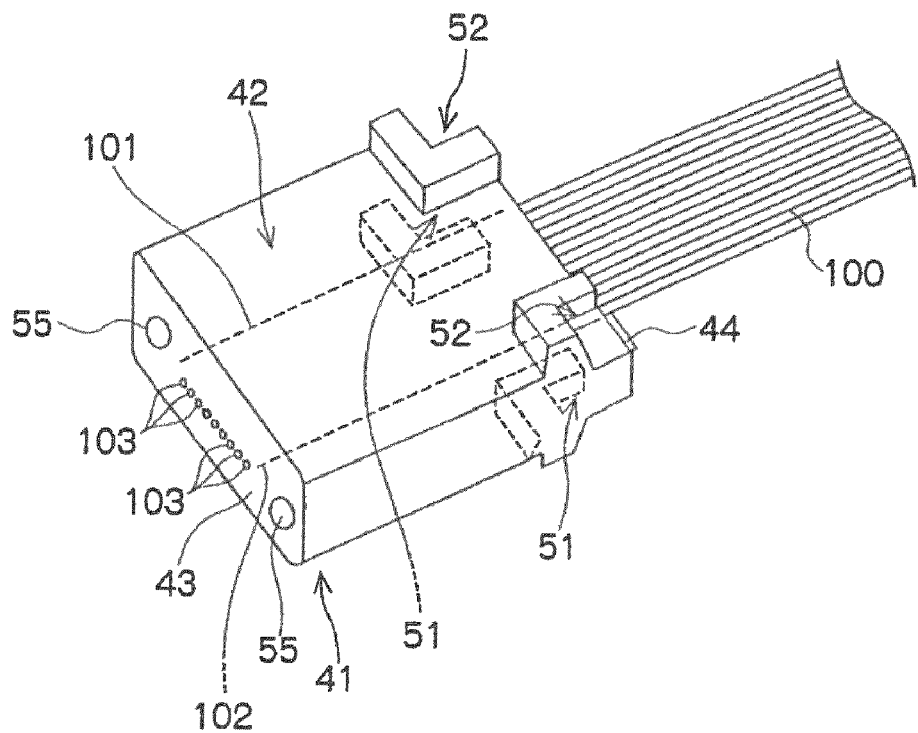
FIG. 3 is a perspective view to show the side of the second flat face portion of the ferrule.
Figure 4:
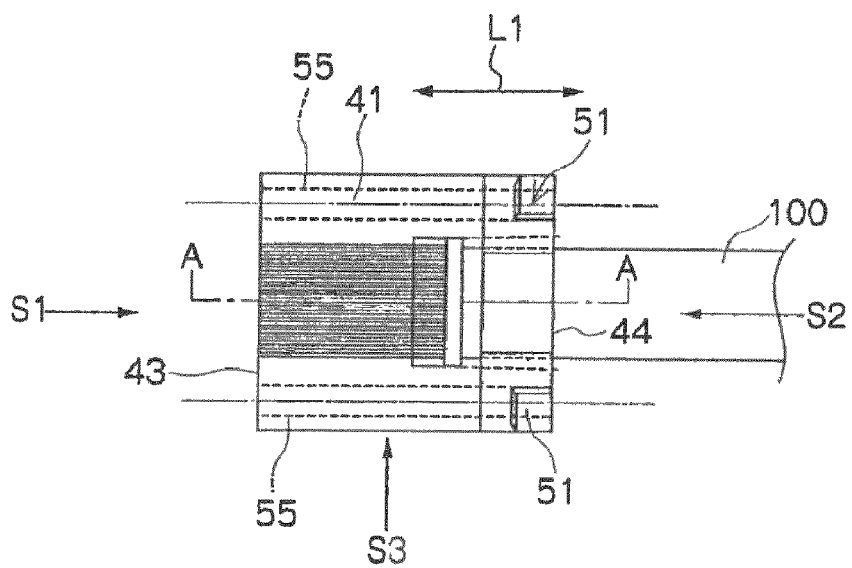
FIG. 4 is a plan view of the ferrule.
Figure 5A:
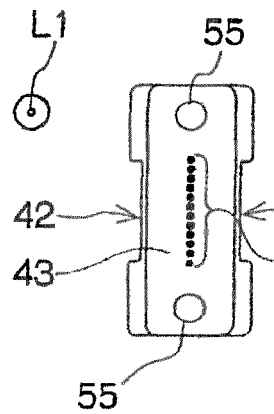
FIG. 5 is a side view of the ferrule.
Figure 5B:
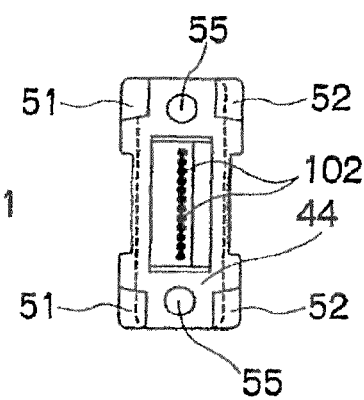

Then, a structural example of the ferrule is described with reference to FIGS. 1 to 6. FIGS. 1 and 2 depict the side of a first flat portion 41 of the ferrule 20. FIG. 3 depicts the side of a second flat portion 42 of the ferrule 20. FIG. 4 is a plan view of depicting the ferrule 20. FIG. 5 (A) is a side view of the ferrule 20 viewed from a direction of an arrow S1 depicted in FIG. 4. FIG. 5(B) is a side view of the ferrule 20 viewed from a direction of an arrow S2 depicted in FIG. 4.

Figure 6A:
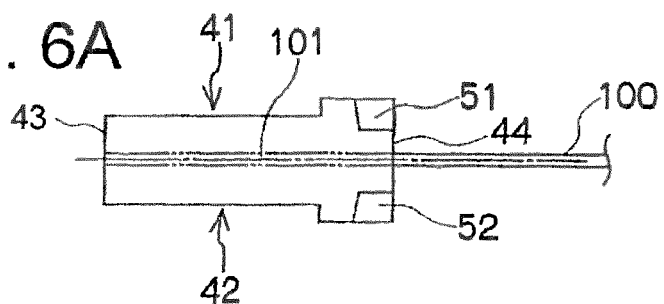
FIG. 6 is a side view and a cross sectional view of the ferrule.
Figure 6B:
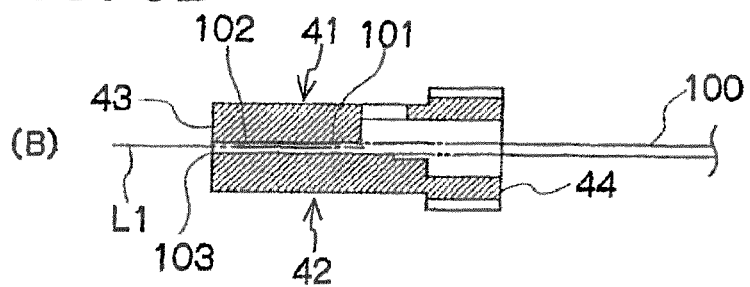

FIG. 6(A) is a side view of the ferrule 20 viewed from a direction of an arrow S3 depicted in FIG. 4. FIG. 6(B) is a cross sectional view of the ferrule 20 along A-A line depicted in FIG. 4.

The ferrule 20 depicted in FIG. 1 is a flat plate type member which can be inserted into the hollow portion 31 of the plug member 21. The ferrule 20 includes the first flat portion 41, the second flat portion 42, an end face 43 to be butted, and a separate end face 44. The first flat portion 41 is the face in opposite side of the second flat portion 42, and the first flat portion 41 and the second flat portion 42 are in parallel each other. The end face 43 to be butted is located in opposite side of the separate end face 44, and the end face 43 and the separate end face 44 are in parallel each other.

As depicted in FIGS. 1 and 2, a recessed portion 51 as a first positioning portion is formed in two corner portions of the first flat portion 41, respectively. In the same manner, as depicted in FIG. 3, a recessed portion 52 as the first positioning portion is formed in the two corner portions of the second flat portion 42, respectively.

The two recessed portions 51, 51 and the two recessed portions 52, 52 are formed in the corresponding positions to the side of the end face 44. In FIG. 4, the two recessed portions 51, 51 are shown, and in FIG. 5, the four recessed portions 51, 52 are shown.

As depicted in FIGS. 2 and 6, the end portion 101 of the set of multiple optical fibers 100 is fixed in the ferrule 20 along the center axis L1. As depicted in FIG. 2, the respective end faces 103 of the optical fibers in the set of multiple optical fibers 100 are exposed to the outside at the side of the end face 43 to be butted of the ferrule under the condition of being aligned along x direction. In the set of multiple optical fibers 100, a plurality of optical fibers 102 are arranged in parallel to be formed in a tape shape. Each optical fiber 102 comprises a core and a cladding to cover the outer peripheral of the core.

As depicted in FIGS. 3 and 4, the ferrule has tow holes 55, 55 for guiding. The holes 55, 55 for guiding are through holes respectively having circular cross section, which are formed from the end face 43 to be butted through the end face 44 in the opposite side along L1 direction.

Then, a structure of the spacer 22 depicted in FIG. 1 is described with reference to FIGS. 7 to 11.

Figure 8:
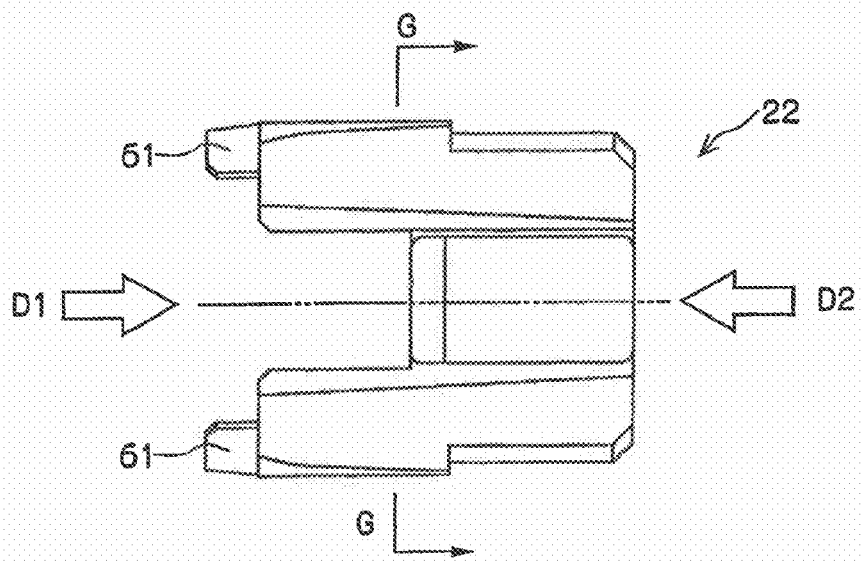
FIG. 8 is a plan view of the spacer.
Figure 9A:
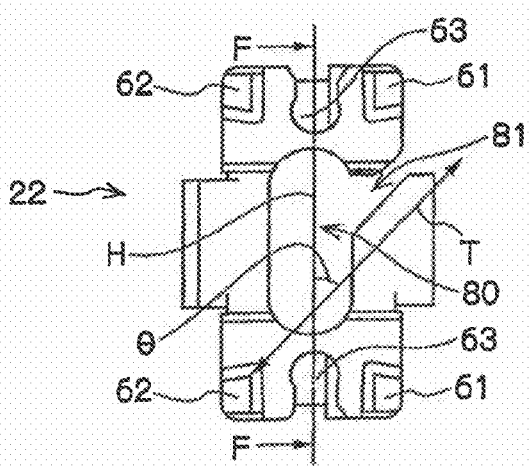
FIG. 9 is a side view of the spacer.
Figure 9B:
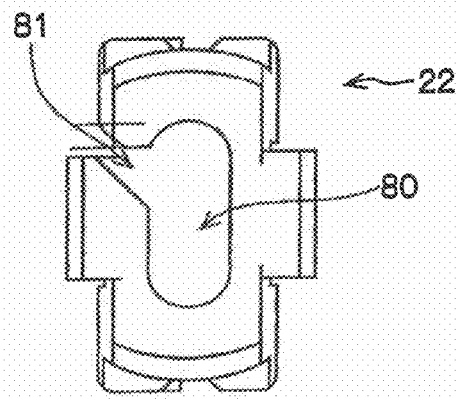
Figure 10:
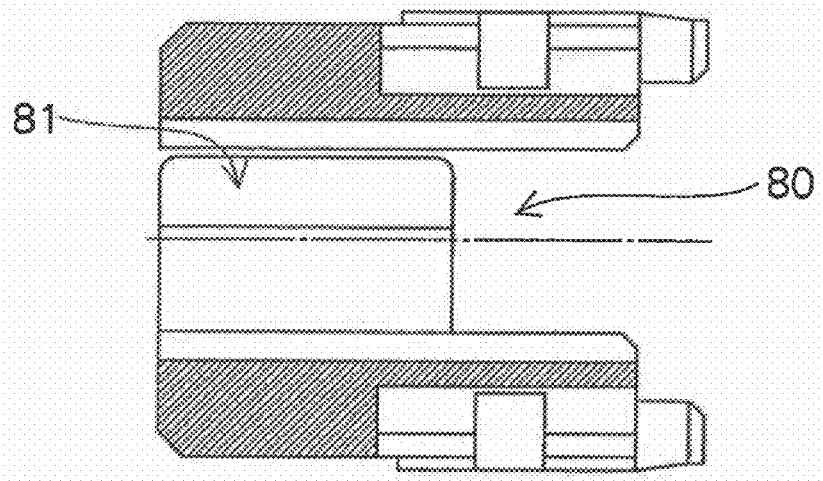
FIG. 10 is a cross sectional view of the spacer.
Figure 11:
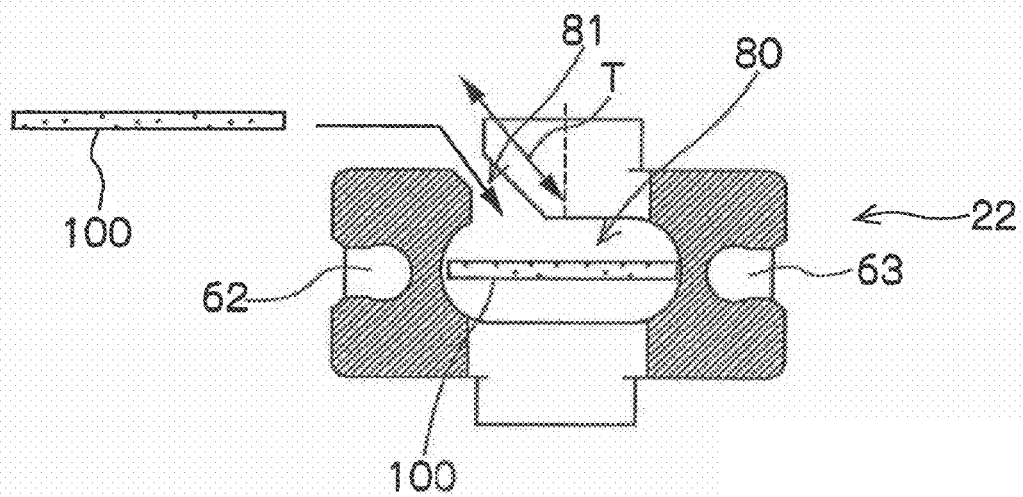
FIG. 11 is another cross sectional view of the spacer.

FIG. 7 is a perspective view to show the spacer 22 and the set of multiple optical fibers 100. FIG. 8 is a plan view of the spacer 22. FIG. 9 (A) is a side view of the spacer viewed from D1 direction depicted in FIG. 8. FIG. 9(B) is a side view of the spacer viewed from D2 direction depicted in FIG. 8. FIG. 10 is a cross sectional view of the spacer 22 along F-F line depicted in FIG. 9(A). FIG. 11 is a cross sectional view of the spacer 22 along G-G line depicted in FIG. 8.

As depicted in FIG. 7, the spacer 22 has four projections 61, 62 as a second positioning portion and two pins 23, 23. The pin 23, 23 is respectively a metal round bar, for example, and is arranged to protrude in parallel from the spacer along L direction.

Although the pin 23, 23 is not shown in FIGS. 8 to 11, the end portion of the pin 23, 23 is inserted in the hole 63, 63 for attaching as depicted in FIGS. 9(A) and 11 and fixed therein.

As depicted in FIG. 7, two corner portions to the side of a first face portion 71 of the spacer 22 have the projections 61 respectively, and two corner portions to the side of a second face portion 72 of the spacer, which is in the opposite side of the first face portion, have the projections 62 respectively. As depicted in FIG. 2, the two pins 23, 23 are respectively inserted in the holes 55, 55 for guiding which are positioned in the corresponding respective positions in the ferrule 20. As depicted in FIG. 2, each tip portion 23S, 23S of the two pins 23, 23 is protruded from the end face 43 to be butted in the ferrule 20 under the condition in which the spacer 22 and the ferrule 20 are assembled.

As depicted in FIG. 2, the two projections 61, 61 in the spacer 22 are formed to be fit into the respective recessed portions 51, 51 in the corresponding positions in the ferrule 20. In the same manner, the two projections 62, 62 in the spacer 22 are formed to be fit into the respective recessed portions 52, 52 in the corresponding positions in the ferrule 20.

Thus, the spacer 22 and the ferrule 20 are fixed each other by the use of the two pins 23, 23. In addition, the spacer 22 and the ferrule 20 can be precisely positioned each other even in two directions X, Y in perpendicular to the longitudinal direction L without displacement by means of the fitting of the four recessed portions 51, 52 and the four projections 61, 62, respectively.

As depicted in FIGS. 9 to 11, the spacer 22 has a receiving hole 80 having an approximately elliptical cross section and a multiple optical fiber guiding groove 81. The receiving hole 80 has function to receive a mid-part of the set of multiple optical fibers 100. The multiple optical fibers guiding groove 81 is formed in such manner as to be cut into from the side of an outer peripheral face of the spacer 22 and communicated to the receiving hole 80. Thus, the multiple optical fibers guiding groove 81 is formed to introduce the set of the multiple optical fibers 100 from the outside of the spacer 22 into the receiving hole 80.

According to the above described structure, the mid-part of the set of multiple optical fibers 100 can be easily and surely introduced into the receiving hole 80 from the outside of the spacer 22 through the multiple optical fibers guiding groove 81, and arranged therein. Thus, assembling efficiency of the optical connector is improved.

As depicted in FIG. 9(A), the direction T of forming the multiple optical fibers guiding groove 81 slants such that an angle $\theta$ between the direction T and the longitudinal direction H of the receiving hole 80 becomes 45 degrees for example. According to the above described feature, as depicted in FIG. 11, the set of multiple optical fibers 100 can be received into the receiving hole 80 through the multiple optical fibers guiding groove 81, and simply and surely arranged along the longitudinal direction H of the multiple optical fibers guiding groove 81.

However, the angle $\theta$ is not limited to 45 degrees. The angle can be arbitrarily selected within a range of from 20 degrees to 80 degrees. With the angle under 20 degrees, the set of multiple optical fibers 100 can be hardly guided into the receiving hole 80 through the multiple optical fibers guiding groove 81. With the angle over 80 degrees, even though the set of multiple optical fibers 100 is guided into the receiving hole 80 through the multiple optical fibers guiding groove 81, the set of multiple optical fibers 100 can be hardly received within the receiving hole 80.

As depicted in FIG. 7, a spring is arranged around the set of multiple optical fibers 100 between the spacer 22 and a boot 88.

Then, assembling process of the ferrule 20, the plug member 21 and the spacer 22 of the optical connector is described.

The ferrule 20 as depicted in FIG. 1 is fixed in advance to the end portion 101 of the set of multiple optical fibers 100 by plastic molding. The mid-part of the set of multiple optical fibers 100 is received in the receiving hole 80 through the multiple optical fibers guiding groove 81 of the spacer 22 as depicted in FIG. 1.

As depicted in FIGS. 1 and 2, two pins 23, 23 of the spacer 22 are respectively inserted in the holes 55, 55 for guiding correspondingly positioned in the ferrule 20.

As depicted in FIG. 2, the two projections 61, 61 in the spacer 22 are fit into the respective recessed portions 51, 51 in the corresponding positions in the ferrule 20, and the two projections 62, 62 in the spacer 22 are fit into the respective recessed portions 52, 52 in the corresponding positions in the ferrule 20.

The set of multiple optical fibers 100 is placed in advance to run through the hollow portion 31 of the plug member 21, and the integrally assembled spacer 22 and the ferrule 20 are fit into the hollow portion 31 of the plug member 21. Thus, the spacer 22 as depicted in FIG. 1 is fit into the holding member 32 within the plug member 21 and fixed therein.

According to the above described feature, the ferrule 20 can be simply and surely held with high precision within the plug member through the spacer 22. The spacer 22 and the ferrule 20 are fixed each other by the use of the two pins 23, 23 without displacement in L1 direction. The spacer 22 and the ferrule 20 can be precisely positioned each other without displacement in two directions X, Y in perpendicular to the longitudinal direction L by means of the fitting of the four recessed portions 51, 52 and the four projections 61, 62, respectively, thus improving the assembling efficiency of the optical connector.

FIG. 12 shows an example in which the end face 103 of each of the optical fiber in the set of multiple optical fibers 100 of the optical connector 10 is butted to the end face 103R of each of the optical fiber in the set of multiple optical fibers 100R of the opposing optical connector 10R and positioned thereto.

The ferrule 20R of the opposing optical connector 10R has the holes 55R, 55R for guiding, and each tip end portion 23S, 23S of the respective pins 23, 23 protrudes from the end face 43 to be butted in the ferrule 20. Accordingly, each tip end portion 23S, 23S is fit into the respective holes 55R, 55R for guiding so that the ferrule 20 of one side and the ferrule 20R of the other side can be positioned each other. Thus, the end face 103 of each of the optical fiber in the set of multiple optical fibers 100 of the optical connector 10 can be precisely butted and positioned to the end face 103R of each of the optical fiber in the set of multiple optical fibers 100R of the optical connector 10R.

Figure 13A:
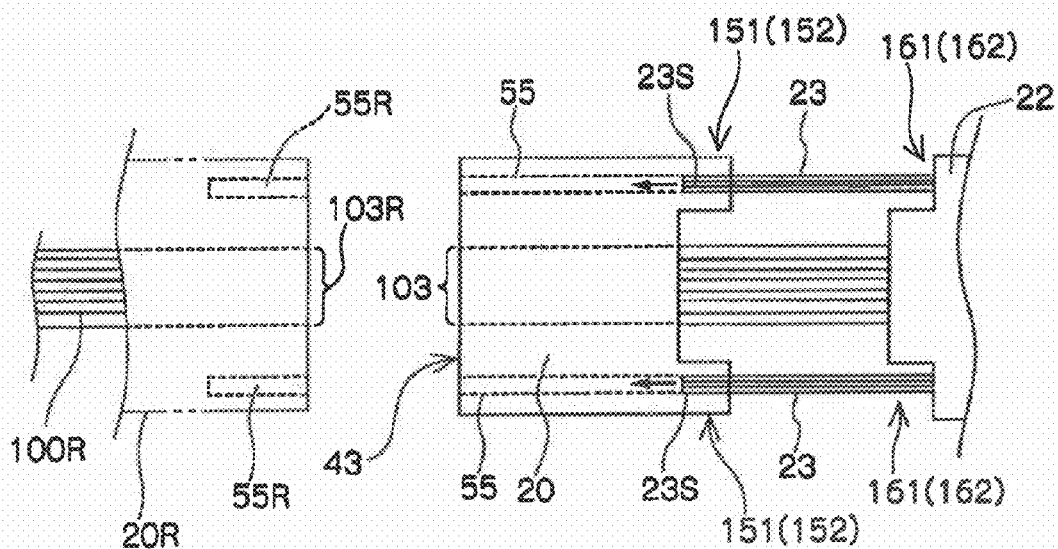
FIG. 13 is a view to show the state in which the set of multiple optical fibers is butted to the other set of multiple optical fibers and positioned thereto by another embodiment of the invention.
Figure 13B:
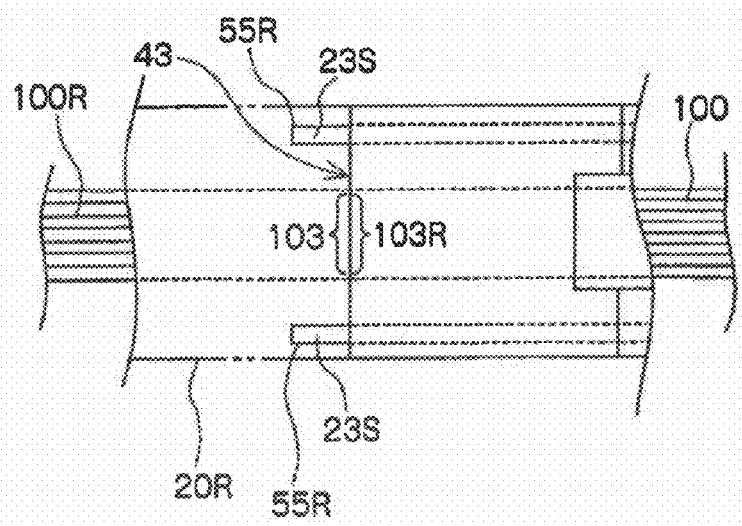

FIG. 13 shows another example in which the end face 103 of each of the optical fiber in the set of multiple optical fibers 100 of the optical connector 10 is butted to the end face 103R of each of the optical fiber in the set of multiple optical fibers 100R of the opposing optical connector 1OR and positioned thereto.

The ferrule 20 has the holes 54, 55 for guiding and four recessed portions 51, 52 as the first positioning portion. The spacer 22 as depicted in FIG. 13 has four projections 61, 62 as the second positioning portion. The ferrule 20R of the opposing optical connector 10R has the pins 23R, 23R protrudes from the end face 43R.

Figure 14A:
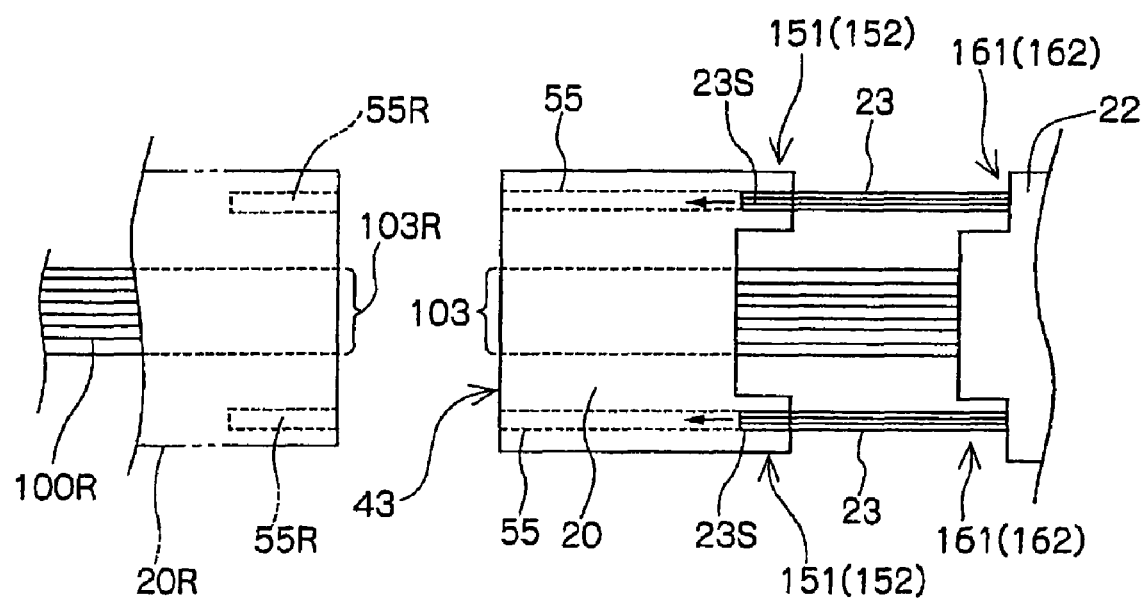
FIG. 14 is a view to show another embodiment of the invention.
Figure 14B:
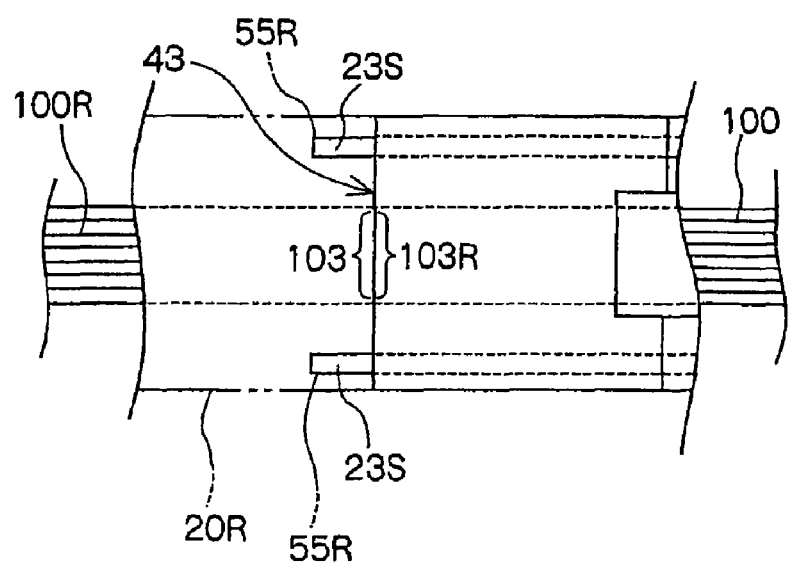

FIG. 14, including FIG. 14A and FIG. 14B, shows another embodiment of the optical connector of the invention. The embodiment as depicted in FIG. 14 is described with the use of the description in the embodiment as depicted in FIG. 12 in which the same reference numeral is given to the same portion. The ferrule 20 as depicted in FIG. 14 has four projections 151, 152 as the first positioning portion, and the spacer 22 as depicted in FIG. 14 has four recessed portions 161, 162 as the second positioning portion.

The present invention can be applied to various modified examples without limiting to the above described embodiments. For example, in the illustrated examples, the spacer 22 has four second positioning portions, and the ferrule 20 has four first positioning portions as depicted in FIG. 1. However, not limited to the above, the spacer may have one, two, three or more than five second positioning portions, and the ferrule 20 may have one, two, three or more than five first positioning portions According to the optical connector of the invention, the ferrule can be simply and surely held within the plug member with high precision.

What is claimed is:

1. An optical connector for connecting two sets of multiple optical fibers, comprising:

a ferrule to secure said set of multiple optical fibers;

a plug member to hold said ferrule; and a spacer that is a unitary piece including a multiple optical fibers guiding groove that extends longitudinally from a first end of the spacer to a second end of the spacer, the guiding groove passing from an outer surface of the spacer through an inner surface, thereby providing a passage to insert the set of multiple optical fibers into the spacer, the spacer being configured to be secured together with said ferrule within said plug member, wherein said ferrule has at least one first positioning portion, and said spacer has at least one second positioning portion which is fitted to a corresponding first positioning portion to position said ferrule to said spacer, and wherein a first plane bisects the spacer widthwise and a second plane bisects the spacer heightwise such that the second plane intersects the first plane substantially perpendicularly, and the guiding groove is disposed along a third slanted plane, the third plane intersecting the first and second planes at a slant at the intersection of the first and second planes such that an angle between the first plane and the third plane ranges between 20 and 80 degrees.

2. An optical connector for connecting two sets of multiple optical fibers, comprising:

a ferrule to secure said set of multiple optical fibers;

a plug member to hold said ferrule; and a spacer that is a unitary piece including a multiple optical fibers guiding groove that extends longitudinally from a first end of the spacer to a second end of the spacer, the guiding groove passing from an outer surface of the spacer through an inner surface, thereby providing a passage to insert the set of multiple optical fibers into the spacer, the spacer being configured to be secured together with said ferrule within said plug member, wherein said ferrule has at least one first positioning portion, and said spacer has at least one second positioning portion which is fitted to a corresponding first positioning portion to position said ferrule to said spacer, wherein said spacer includes a pin for guiding, and said spacer is integrally fixed to said ferrule by means of inserting the pin into said ferrule to be secured together with said ferrule within said plug member, and wherein a first plane bisects the spacer widthwise and a second plane bisects the spacer heightwise such that the second plane intersects the first plane substantially perpendicularly, and the guiding groove is disposed along a third slanted plane, the third plane intersecting the first and second planes at a slant at the intersection of the first and second planes such that an angle between the first plane and the third plane ranges between 20 and 80 degrees.

3. An optical connector for connecting two sets of multiple optical fibers, comprising:

a ferrule to secure said set of multiple optical fibers;

a plug member to hold said ferrule; and a spacer that is a unitary piece including a multiple optical fibers guiding groove that extends longitudinally from a first end of the spacer to a second end of the spacer, the guiding groove passing from an outer surface of the spacer through an inner surface, thereby providing a passage to insert the set of multiple optical fibers into the spacer, the spacer being configured to be secured together with said ferrule within said plug member, wherein said ferrule has at least one first positioning portion, and said spacer has at least one second positioning portion which is fitted to a corresponding first positioning portion to position said ferrule to said spacer, wherein said first positioning portion includes a recessed portion, and said second positioning portion includes a projection, and wherein a first plane bisects the spacer widthwise and a second plane bisects the spacer heightwise such that the second plane intersects the first plane substantially perpendicularly, and the guiding groove is disposed along a third slanted plane, the third plane intersecting the first and second planes at a slant at the intersection of the first and second planes such that an angle between the first plane and the third plane ranges between 20 and 80 degrees.

4. An optical connector for connecting two sets of multiple optical fibers, comprising:

a ferrule to secure said set of multiple optical fibers;

a plug member to hold said ferrule; and a spacer that is a unitary piece including a multiple optical fibers guiding groove that extends longitudinally from a first end of the spacer to a second end of the spacer, the guiding groove passing from an outer surface of the spacer through an inner surface, thereby providing a passage to insert the set of multiple optical fibers into the spacer, the spacer being configured to be secured together with said ferrule within said plug member, wherein said ferrule has at least one first positioning portion, and said spacer has at least one second positioning portion which is fitted to a corresponding first positioning portion to position said ferrule to said spacer, wherein said first positioning portion includes a projection, and said second positioning portion includes a recessed portion, and wherein a first plane bisects the spacer widthwise and a second plane bisects the spacer heightwise such that the second plane intersects the first plane substantially perpendicularly, and the guiding groove is disposed along a third slanted plane, the third plane intersecting the first and second planes at a slant at the intersection of the first and second planes such that an angle between the first plane and the third plane ranges between 20 and 80 degrees.

5. The optical connector according to claim 1, wherein said first positioning portion includes a plurality of positioning portions formed in said ferrule, and said second positioning portion includes a plurality of positioning portions formed in said spacer.

6. The optical connector according to claim 1, wherein said spacer further includes a receiving hole for receiving said set of multiple optical fibers.

7. The optical connector according to claim 2, wherein said first positioning portion includes a recessed portion, and said second positioning portion includes a projection.

8. The optical connector according to claim 2, wherein said first positioning portion includes a projection, and said second positioning portion includes a recessed portion.

9. The optical connector according to claim 2, wherein said first positioning portion includes a plurality of positioning portions formed in said ferrule, and said second positioning portion includes a plurality of positioning portions formed in said spacer.

10. The optical connector according to claim 3, wherein said first positioning portion includes a plurality of positioning portions formed in said ferrule, and said second positioning portion includes a plurality of positioning portions formed in said spacer.

11. The optical connector according to claim 4, wherein said first positioning portion includes a plurality of positioning portions formed in said ferrule, and said second positioning portion includes a plurality of positioning portions formed in said spacer.

12. The optical connector according to claim 2, wherein said spacer further includes a receiving hole for receiving said set of multiple optical fibers.

13. The optical connector according to claim 3, wherein said spacer further includes a receiving hole for receiving said set of multiple optical fibers.

14. The optical connector according to claim 4, wherein said spacer further includes a receiving hole for receiving said set of multiple optical fibers.

15. An optical connector for connecting two sets of multiple optical fibers, comprising:

a ferrule to secure said set of multiple optical fibers, the ferrule including
an end face,
a first flat portion,
and a second flat portion, the first and second flat portions being substantially parallel and intersecting the end face substantially perpendicularly;

a plug member to hold said ferrule; and a spacer that is a unitary piece having a guiding groove, the spacer configured to be secured with said ferrule within said plug member, the spacer including a front face having projecting prongs extending from each corner of the front face toward the ferrule, wherein the first and second flat portions of the ferrule include a recessed portion and a raised portion disposed on each corner of the first and second flat portions abutting the end face of the ferrule, the recessed portions configured to receive the projecting prongs disposed on the corners of the spacer and the raised portions securing the projecting prongs in a secured position, and wherein a first plane bisects the spacer widthwise and a second plane bisects the spacer heightwise such that the second plane intersects the first plane substantially perpendicularly, and the guiding groove is disposed along a third slanted plane, the third plane intersecting the first and second planes at a slant at the intersection of the first and second planes such that an angle between the first plane and the third plane ranges between 20 and 80 degrees.

16. The optical connector according to claim 1, wherein the guiding groove is disposed in the spacer such that a direction of forming the guiding groove slants at an angle of approximately 45°, the angle being measured between a direction of forming the guiding groove and a plane bisecting a receiving hole through the spacer.

17. The optical connector according to claim 1, wherein the second positioning portion includes a plurality of projections, and
   wherein the guiding groove is disposed in the spacer such that it passes between the plurality of projections, avoiding intersection therewith.

* * * * *